United States Patent [19]

Trueb et al.

[11] Patent Number: 5,163,469
[45] Date of Patent: Nov. 17, 1992

[54] UNITARY ARTICLE COMPRISING PROTECTIVE SYSTEM COMPONENTS

[75] Inventors: Thomas W. Trueb, Ellington; Steven R. Trueb, Vernon, both of Conn.

[73] Assignee: Truebro Partnership, Ellington, Conn.

[21] Appl. No.: 754,048

[22] Filed: Sep. 3, 1991

Related U.S. Application Data

[63] Continuation-in-part of Ser. No. 569,995, Aug. 20, 1990, Pat. No. 5,054,513.

[51] Int. Cl.$^5$ .............................................. F16L 7/00
[52] U.S. Cl. .................................. 137/375; 137/247.51; 137/797; 285/47; 138/155; 138/158
[58] Field of Search ............... 138/155, 158, DIG. 11, 138/157; 137/247.49, 247.51, 797, 375; 285/47

[56] References Cited

U.S. PATENT DOCUMENTS

| | | | |
|---|---|---|---|
| 2,037,625 | 4/1936 | Goepel et al. | 285/122 |
| 2,650,180 | 8/1953 | Walker | 154/44 |
| 2,761,949 | 9/1956 | Colton | 219/38 |
| 2,937,662 | 5/1960 | Green | 138/25 |
| 3,153,546 | 10/1964 | Dunn | 285/13 |
| 3,177,528 | 4/1965 | Flower et al. | 18/36 |
| 3,402,731 | 9/1968 | Martin | 137/375 |
| 3,559,694 | 2/1971 | Volberg | 138/147 |
| 3,598,157 | 8/1971 | Farr | 138/157 |
| 3,719,209 | 3/1973 | Rush et al. | 138/177 |
| 3,960,181 | 6/1976 | Baur et al. | 138/178 |
| 4,205,105 | 5/1980 | Blundell | 428/36 |
| 4,240,462 | 12/1980 | Bankstahl | 137/377 |
| 4,441,743 | 4/1984 | Steenbergen | 285/21 |
| 4,463,780 | 8/1984 | Schultz et al. | 138/178 |
| 4,669,509 | 6/1987 | Botsolas | 138/178 |
| 4,713,271 | 12/1987 | Searl et al. | 428/36 |
| 4,840,201 | 6/1989 | Botsolas | 138/178 |

FOREIGN PATENT DOCUMENTS 1249974 2/1989 Canada .

Primary Examiner—A. Michael Chambers
Attorney, Agent, or Firm—Ira S. Dorman

[57] ABSTRACT

A unitary article is cut into sections to provide pieces that are configured for emplacement upon under-sink piping, as insulation against burn injury from contact with hot surfaces. Three pieces cooperate with one another to provide a system for enclosing an installed P-trap assembly.

5 Claims, 2 Drawing Sheets

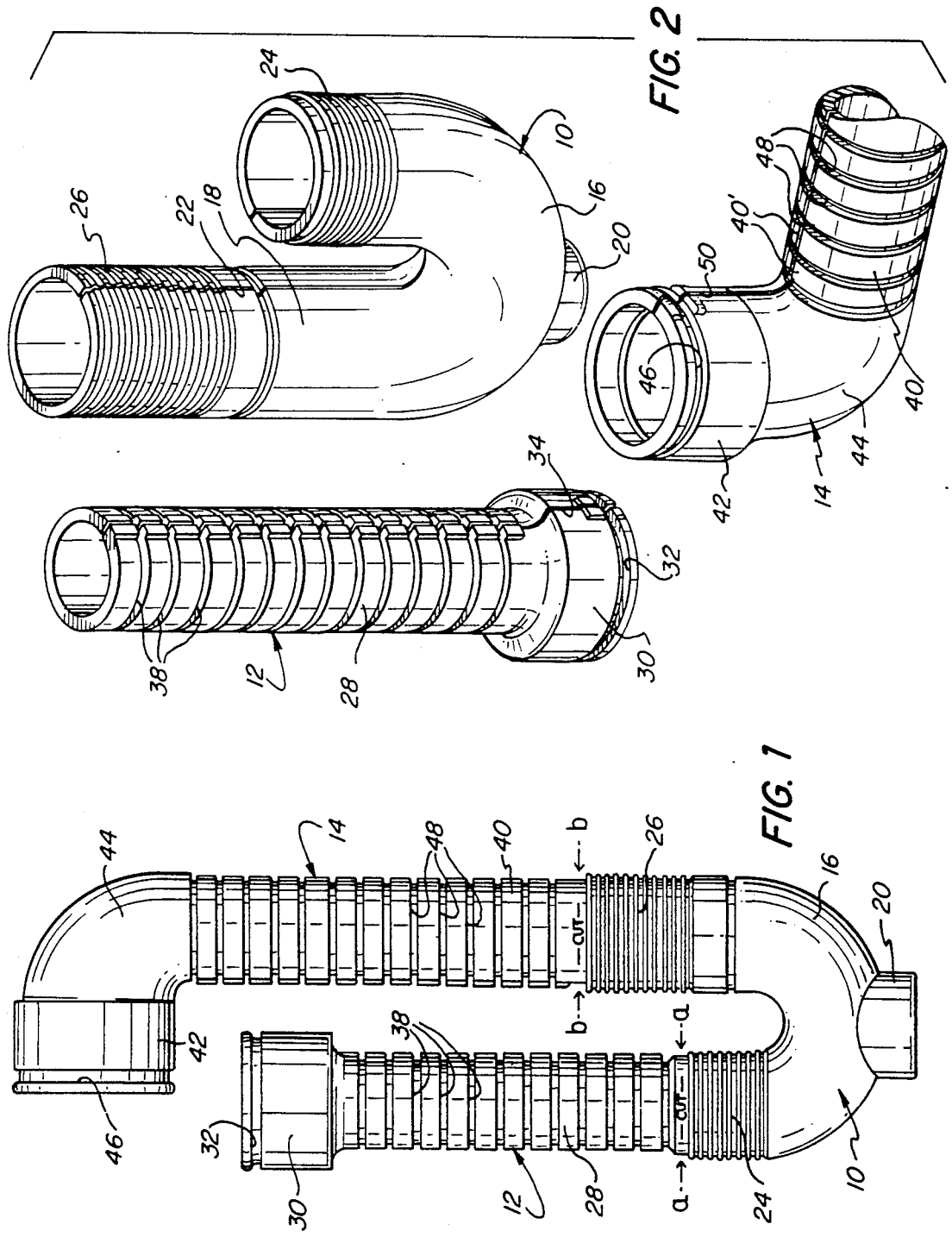

UNITARY ARTICLE COMPRISING PROTECTIVE SYSTEM COMPONENTS

CROSS-REFERENCE TO RELATED APPLICATION

This application is a continuation-in-part of application for Letters Patent Ser. No. 07/569,995, filed Aug. 20, 1990 and now U.S. Pat. No. 5,054,513 issued Oct. 8, 1991.

BACKGROUND OF THE INVENTION

Regulations in place in many municipalities require that the so-called "P-trap" assembly (i.e., the waste water piping under sinks and the like) be insulated so as to prevent injury from contact with hot metal surfaces. Wheelchair bound individuals are at particular risk.

The required thermal insulation may be supplied by wrapping or otherwise applying lengths of insulation (such as of foam rubber and the like) about the pipes. Such practices are however undesirable for a number of reasons: application is often difficult and time-consuming; the applied insulating material tends to become disoriented and displaced; the finished installation is typically unaesthetic; and often the result is simply ineffective.

The prior art suggest a wide variety of pipe covering techniques and structures. For example, Far et al U.S. Pat. No. 3,598,157 discloses preformed covering pieces made of foamed plastics and configured for various pipe fittings. Blundell U.S. Pat. No. 4,205,105 shows an elongated pipe-insulating structure that is axially slit along one side, and Martin U.S. Pat. No. 3,402,731 provides foamed insulating sleeves for pipe elements.

U.S. Pat. Nos. 2,650,180, 2,937,662, 3,153,546, 3,559,694, 4,441,743 and 4,840,201, to Walker, Green, Dunn, Volberg, Steenbergen and Botsolas, respectively, all show encased insulating structures applied to pipes and fittings; U.S. Pat. Nos. 3,960,181, 4,463,780 and 4,669,509, to Baur et al, Schultz et al and Botsolas, respectively, provide one-piece covering wrappings fabricated from flexible plastic materials; and U.S. Pat. Nos. 3,177,528 and 3,719,209, to Flower et al and Rush et al, respectively, are directed to electrically insulated coatings for pipe fittings and to extruded plastic plumbing traps.

Despite the activity in the art indicated by the foregoing, there has been a need for means by which under-sink piping can quickly, easily, and inexpensively be thermally insulated. Although Applicants' copending application Ser. No. 07/569,995 now U.S. Pat. No. 5,054,513 issued Oct. 8, 1991 provides a thermal insulation system and installation by and in which the foregoing needs are satisfied, advantage is seen in simplifying manufacture, handling and packaging of system components of the kind described therein.

Accordingly, the broad objects of the present invention are to provide a novel article from which such an insulation system is readily produced, and to provide a novel method for thermally insulating a piping assembly utilizing the same.

More specific objects of the invention are to provide such an article which is, in addition to the foregoing, of relatively simple and inexpensive construction, is facile to handle and package, and is quick and easy to employ.

SUMMARY OF THE INVENTION

It has now been found that certain of the foregoing and related objects of the invention are attained by the provision of a unitary article comprising a first, substantially J-shaped tubular section, a second, substantially straight tubular section, and a third, substantially L-shaped tubular section. The article is fabricated as a single piece from a resiliently yieldable material having thermal insulating properties, and the sections thereof are disposed in end-to-end relationship to one another, with the "first" section interposed between the "second" and "third."

The sections of the article will usually be of substantially the same cross-sectional dimensions along their lengths, and so constructed as to enable emplacement over a corresponding part of an installed P-trap piping assembly with overlapping end portions of the "second" and "third" sections disposed in overlapped relationship with portions at the opposite ends of the "first" section; for that purpose, the overlapping end portions will normaly be of enlarged cross-sectional dimensions, relative to the "same" dimensions.

In preferred embodiments, the overlapping end portions will be at opposite ends of the unitary article, and the "second" and "third" sections will extend substantially parallel to one another form the "first" section, with the overlapping end portion of the "third" section extending beyond and lying substantially over the overlapping end portion of the "second" section. The sections of the article will normally be longitudinally slit, to permit spreading of the marginal portions that extend therealong, and they will preferably be demarcated by indicia thereon, designating locations for severance.

Other objects of the invention are attained by the provision of a method for thermally insulating a P-trap piping assembly, using an article having the construction herein described. In accordance with the method, the article is initially severed to separate the sections thereof from one another; the sections are then placed over corresponding parts of an installed P-trap piping assembly, and secured in position with end portions thereof overlapped, as described.

BRIEF DESCRIPTION OF THE DRAWINGS

FIG. 1 is an elevational view of an article embodying the present invention;

FIG. 2 is an exploded perspective view of the article of FIG. 1, cut into three pieces.

DETAILED DESCRIPTION OF THE ILLUSTRATED EMBODIMENTS

Figure 3:
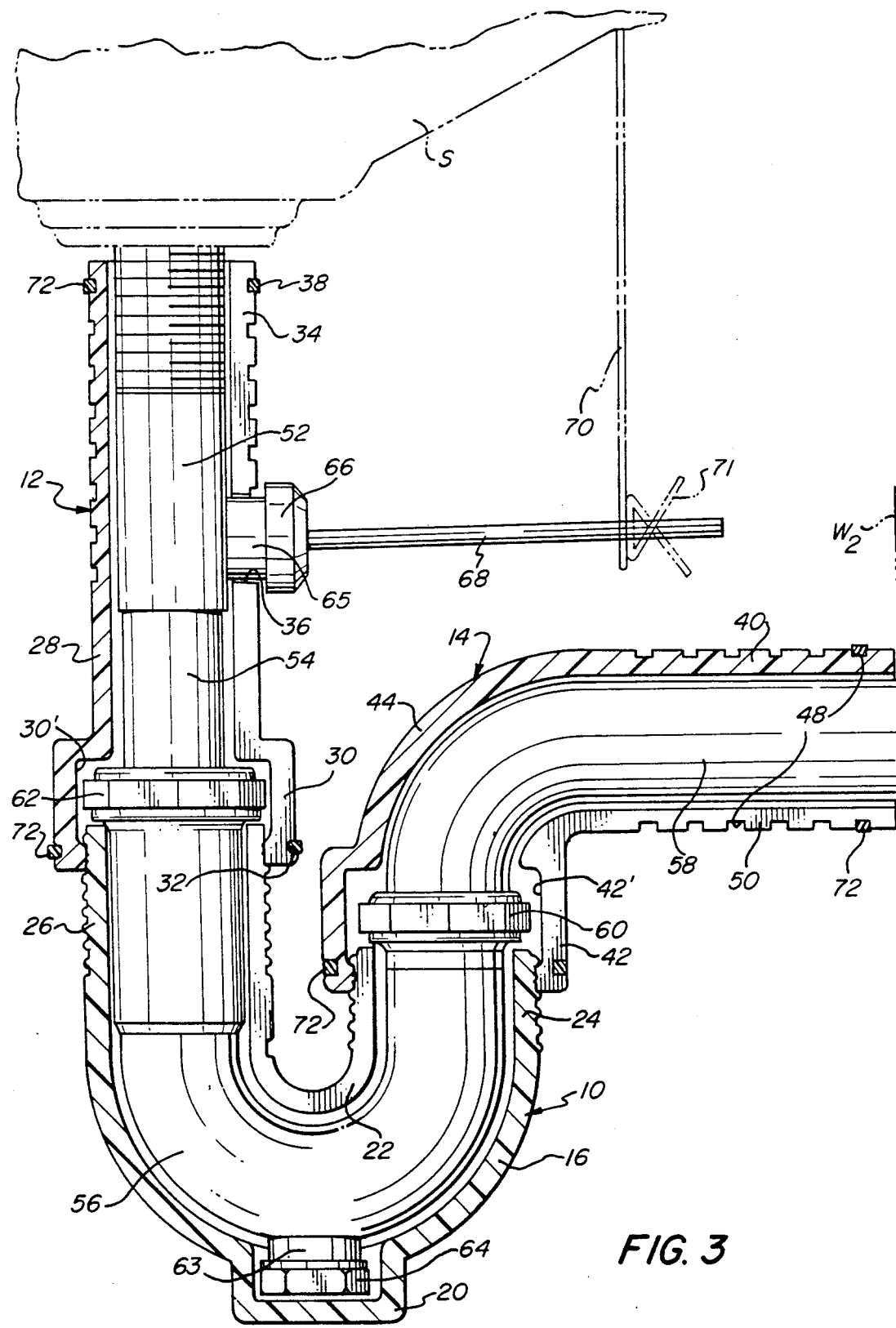
FIG. 3 is a sectional view showing the pieces of which the article of FIG. 1 is comprised, installed upon P-trap under-sink plumbing.

FIG. 1 of the drawings illustrates a unitary article embodying the invention, fabricated from a resiliently yieldable, rubbery, thermally insulating material. The article consists of a substantially J-shaped tubular section, a substantially straight tubular section, and a substantially L-shaped tubular section, generally designated respectively by the numerals 10, 12, and 14. In FIG. 2, the same sections are shown as separate pieces, having been produced therefrom by severance along the lines a—a and b—b, bearing "-CUT-" indicia.

The J-shaped section or piece 10 includes a toric portion 16 and a straight portion 18, and is slit at 22, along its entire length. The toric portion 16 has a clean-out aperture-forming element 20 projecting from a radially outer wall portion thereof, in a medial plane and in an arcuately centralized location.

The straight piece 12 consists of an elongate cylindrical portion 28 and a short collar portion 30 at one end; slit 34 extends longitudinally therealong. A circumferential groove 32 surrounds the collar portion 30 adjacent its open end, and a series of similar grooves 38 are provided at equidistantly spaced locations on the cylindrical portion 28.

L-shaped piece 14 consists of a straight portion 40 and a collar portion 42, with a 90° arcuate portion 44 therebetween. The collar portion 42 has a circumferential groove 46 extending thereabout adjacent its open end, and a series of like grooves 48 surround the straight portion 40 at equidistantly spaced locations. The piece 14 is longitudinally slit at 50, thereby defining relatively displaceable marginal portions 40' along the length thereof. It will be appreciated that the slits 22, 34, 50 are elements of a continuous slit made in the unitary article, and that like displaceable portions are also defined on the pieces 10 and 12.

With particular reference now to FIG. 3, the drain plumbing for a sink "S" (shown in phantom line) is depicted, and includes a tailpiece member consisting of two, telescopically interengaged parts 52, 54, a J-bend 56, and a waste arm 58 extending from wall "W." The plumbing components have standard flanged and threaded end portions (not shown), which enable them to be joined by the nuts 60, 62 in end-to-end relationship. A clean-out access port is formed through the outer wall of the toric section of the J-bend 56, and is surrounded by a short neck portion 63, normally closed by the "nut" or cap 64. The upper part 52 of the tailpiece assembly is threadably engaged with the bottom of the sink S, and is formed with an access port surrounded by a short neck portion 65, partially closed by an annular cap 66, through which extends the operating arm 68 for a "pop-up" drain plug mechanism (not illustrated). In conventional manner, the linkage 70 connects the arm 68 to an operating handle, and is secured on the arm 68 by a spring clip 71; the neck portion 65 is accommodated by cutting a hole 36 of appropriate diameter through the portion 28 of the straight piece 12, which would usually be done at the time of installation.

The J-shaped piece 10 of the insulation system is installed over the J-bend 56 of the piping assembly with the neck portion 63 and nut 64 of the clean-out structure protruding into the element 20. Emplacement is achieved of course simply by spreading the marginal portions along the slit 22, which portions thereafter resume their original shape due to the inherent resiliency, or elastic memory, of the material from which the piece is fabricated. Although not shown, it will be appreciated that access to the nut 64 is afforded simply by cutting away the projecting element 20.

The nut 60 and associated parts, as well as the corrugated end portion 24 of the J-piece 10, are accommodated within the recess 42' defined by collar portion 42 on the L-shaped piece 14, the latter being applied to the waste arm 58 in the manner previously described. Plastic bands 72, seated within the circumferential grooves 46 and 48 at the opposite ends of the piece 14, secure it to the piece 10 and to the P-trap components 56, 58; it will be appreciated that the bands 72 will conveniently incorporate an automatic locking ratchet mechanism (not shown), the structure of which is conventional.

The straight tubular piece 12 is similarly applied to encase the tailpiece assembly 52, 54; the nut 62 and associated parts, together with the corrugated opposite end portion 26 of the J-shaped piece 10, are seated within the enlarged recess 30' formed by the collar portion 30 thereof. The straight piece 12 is secured to the J-shaped piece 10 and the drain components 52, 56 by use of banding elements 72 received in the circumferential grooves 32 and 38, with the plug-mounting structure 65, 66 protruding laterally through the hole 36 therein.

Although the drawings and the corresponding portions of the specification describe the best mode contemplated for carrying out the invention, and the configuration shown and described is particularly advantageous from manufacturing, packaging and handling standpoints, it will be understood that variations can be made without departing from the novel concepts hereof. Thus, while the unitary construction, in and of itself, affords substantial benefits, changes may be made for example in the shapes, features and relationships among the several sections of the article to best accommodate peculiarities of particular installations or styles of piping. The circumferential grooves and cooperating plastic bands shown in the drawings provide a highly effective means for securing the parts in assembly, but suitable alternatives may occur to those skilled in the art and may be employed. It might be mentioned that the series of grooves 38 and 48 on the straight and L-shaped pieces 12, 14, respectively, serve not only to receive the bands 72 in a very neat and functionally desirable manner, but also to designate locations for cutting; as a practical matter, these sections may be made to lengths that will normally be excessive, intending that they be cut to size at the time of installation.

As has been mentioned, the preferred material for fabrication of the insulating pieces will usually be a synthetic elastomeric material, such as a polyurethane, a polyvinyl chloride, or a silicon rubber, so as to provide the desired resiliency for facile installation; the material may or may not be of a foamed structure, and may of course be of any desired coloration. In most cases the article will be produced by molding using any technique that is appropriate under the circumstances, as will be apparent to those skilled in the art.

It might also be mentioned that the article will normally have a nominal wall thickness ranging from ⅛ inch to ½ inch, with ¼ inch often providing a most desirable balance of functional properties and cost factors; its overall length, width and depth will typically be somewhat less than about 16, 6 and 3 inches, respectively. Finally, it will be appreciated that the system described can be used to insulate piping of plastic as well as of metal, and that the components will normally afford protection against impact injury as well as against burns.

Thus, it can be seen that the present invention provides a novel article from which is readily produced a system for quickly, easily and inexpensively insulating under-sink piping, so as to provide highly effective protection against burn injury from hot metal surfaces. The invention additionally provides a novel method for insulating a piping assembly, utilizing the article described.

Having thus described the invention, what is claimed is:

1. A unitary article of thermal insulation for the P-trap piping assembly of a sink or the like, comprising a first, substantially J-shaped tubular section consisting of first and second straight portions and a torric portion therebetween, each of said portions having opposite ends, said straight portions being joined at one end thereof to said opposite ends of said torric portion and extending therefrom in the same direction and parallel to one another, said first portion being longer than said second portion; a second, substantially straight tubular section having opposite ends; and a third, substantially L-shaped tubular section comprised of a straight portion having opposite ends, and a 90° arcuate portion having opposite ends, one of said opposite ends of said arcuate portion being joined to one of said ends of said straight portion of said L-shaped section, the other of said ends of said straight portion of said L-shaped section being joined to the other end of said first straight portion of said J-shaped section, and one of said ends of said straight section being joined to the other end of said second straight portion of said J-shaped section, said arcuate portion of said L-shaped section extending toward said straight section and being disposed outwardly of the other of said ends thereof; said article being fabricated as a single piece from a resiliently yieldable material having thermal insulating properties.

2. The article of claim 1 wherein said sections are of substantially the same cross-sectional dimensions along their lengths, and wherein a collar portion of enlarged cross-sectional dimensions, relative to said same dimensions, is provided both on the other end of said arcuate portion of said L-shaped section and also on said other end of said straight section, said collar portions of said straight section and said L-shaped section being dimensioned and configured to receive therewithin, respectively, said other ends of said first and second straight portions of said J-shaped section.

3. The article of claim 1 wherein said sections are longitudinally slit to permit spreading of the marginal portions that extend along the slits.

4. The article of claim 1 wherein said sections are demarcated by indicia designating locations for severance.

5. A method for thermally insulating the P-trap piping assembly of a sink or the like, including the steps:
(a) providing a unitary article in accordance with claim 1
(b) severing said article to separate said sections from one another;
(c) placing said sections over corresponding parts of an installed P-trap piping assembly, with said end portions so overlapped; and
(d) securing said sections in such emplaced positions.

* * * * *